US007158285B2

(12) United States Patent
Yoshida

(10) Patent No.: US 7,158,285 B2
(45) Date of Patent: Jan. 2, 2007

(54) RAMAN AMPLIFICATION REPEATER AND OPTICAL TRANSMISSION SYSTEM USING THE SAME

(75) Inventor: Fumisato Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/937,851

(22) Filed: Sep. 9, 2004

(65) Prior Publication Data
US 2005/0100343 A1    May 12, 2005

(30) Foreign Application Priority Data
Nov. 7, 2003    (JP)    ............................. 2003-379075

(51) Int. Cl.
*H01S 3/00* (2006.01)
*H04B 10/12* (2006.01)
(52) U.S. Cl. ..................................... 359/334
(58) Field of Classification Search ................. 359/334
See application file for complete search history.

(56) References Cited
U.S. PATENT DOCUMENTS
6,292,288 B1 * 9/2001 Akasaka et al. ............ 359/334

| 6,542,287 | B1 * | 4/2003 | Ye et al. | 359/334 |
| 6,606,188 | B1 * | 8/2003 | Shimojoh | 359/334 |
| 6,879,434 | B1 * | 4/2005 | Aoki et al. | 359/334 |
| 2002/0054733 | A1 * | 5/2002 | Kagi et al. | 385/27 |
| 2002/0122242 | A1 * | 9/2002 | Shimojoh | 359/334 |
| 2005/0078355 | A1 * | 4/2005 | Yoshida | 359/334 |

FOREIGN PATENT DOCUMENTS

JP    2000-098433    4/2000

* cited by examiner

*Primary Examiner*—Jack Keith
*Assistant Examiner*—Eric Bolda
(74) *Attorney, Agent, or Firm*—Scully, Scott, Murphy & Presser, P.C.

(57) ABSTRACT

A Raman amplification repeater which conducts amplification of signal lights by Raman scattering which occurs when pumping lights are applied to a transmission path fiber, in which output power of the pumping light is controlled by monitoring, by means of a plurality of PDs, signal light power caused by excitation by using signal lights having wavelengths for monitoring whose number is not less than the number of the pumping light wavelengths and not more than the number of signal lights and which are monitoring wavelengths in a signal band of the signal light.

21 Claims, 11 Drawing Sheets

RAMAN AMPLIFICATION REPEATER AND OPTICAL TRANSMISSION SYSTEM USING THE SAME

BACKGROUND OF THE INVENTION

1. Field of the Invention

The present invention relates to a Raman amplification repeater using the amplification function of a signal light caused by Raman scattering which occurs when a pumping light LD is applied to a transmission path fiber and, more particularly, a Raman amplification repeater which enables control of Raman amplification and an optical transmission system using the same.

2. Description of the Related Art

For meeting an increasing demand for communication created as the Internet has been widely used, transmission capacities of optical transmission systems forming a basic communication network have been recently increased at a surprising speed.

In order to cope with such a rapid increase in transmission capacity, optical wavelength division multiplexing techniques (WDM technique) have been established to enable transmission data capacities to be increased.

In a long-distance transmission system, however, expansion of a repeating interval is a target which is hard to achieve as well as scale-up of a transmission capacity.

Under these circumstances, for ensuring a signal to noise power ratio (optical SN ratio) per one wavelength and mitigating transmission waveform distortion caused by the fiber nonlinear effect, proposed is a transmission method, called Raman amplification, of canceling a loss of a transmission path. In this method, in order to realize long-distance transmission, reduction in the fiber nonlinear effect and noise is required, as is flattening of an output spectrum, which is crucial in WDM transmission because a relationship between a gain and pumping light power largely depends on a kind of transmission path and the like.

Structure and operation of a conventional repeater (Example 1 of Conventional Art) using Raman amplification will be described with reference to FIG. 13.

In FIG. 13, wavelengths of pumping light LDs (Laser Diode) 103a, 103b and 103c are 1462.4 nm, 1475.0 nm and 1503.1 nm, respectively, and a signal wavelength band ranges from 1574 to 1609 nm. After being multiplexed by WDM (Wavelength Division Multiplex) couplers 102a and 102b, pumping lights are multiplexed by a pumping light WDM coupler 101 with a signal light on an optical transmission path in the reverse direction to each other. The Pumping light output from a pumping light output point onto the optical transmission path amplifies, in the optical transmission path, a signal light band which is about 13.2 THz apart from the pumping light.

First, by using an appropriate transmission path fiber, output power of the pumping light LDs 103a, 103b and 103c having different wavelengths is obtained so as to have a flat output spectrum after, for example, 7 dB Raman amplification.

Connection to an actual transmission path fiber and operation of the respective pumping light LDs 103a, 103b and 103c by the pumping light output power obtained before the connection to the transmission path is made to conduct Raman amplification.

FIG. 14 shows an output spectrum obtained when Raman amplification is conducted by the above-described conventional Raman amplification repeater. As shown in FIG. 14, with the conventional Raman amplification repeater, since monitor control of an output signal by a PD or the like is not conducted, a control target value of a pumping light LD can not be determined because of a difference in transmission path fibers, or in intra-office losses or the like. As a result, it is difficult to maintain a gain spectrum within a signal band as flat.

Although another system for flattening a Raman amplification spectrum is proposed, which automatically measures gain efficiency of a transmission path to set pumping light power, with such open loop control, when a transmission loss varies due to environment change or the like, or when a signal spectrum slants in the transmission path, it will be difficult to obtain a flat output spectrum.

Description will be made of the Raman amplification repeater (Example 2 of Conventional Art) disclosed in Japanese Patent Laying-Open (Kokai) No. 2000-98433 (Literature 1), which is conventional art for solving the above-described problems. The Raman amplification repeater recited in Literature 1 is characterized as including a pumping light means for generating a plurality of pumping lights and a pumping light power control means for monitoring an input light, or an output light to control each pumping light power based on the monitoring result.

The pumping light power control means recited in Literature 1 controls power of each wavelength light by branching a monitoring light from an output light into a light of a wavelength obtained by adding about 100 nm to a wavelength of each pumping light and monitoring these wavelength lights. The Raman amplification repeater has its peak of a gain at a frequency about 13 THz lower than a frequency of the pumping light, and has a frequency about 13 THz lower as a wavelength about 100 nm longer.

In addition, the pumping light power control means distributes as many monitoring lights branched from an output light as the pumping lights and then monitors each wavelength light which is obtained by adding about 100 nm to a wavelength of each pumping light.

As described in the foregoing, conventional Raman amplification repeaters have difficulty obtaining a flat output spectrum with respect to a light signal within a signal band due to a difference in a transmission path fiber or in intra-office losses or the like.

On the other hand, because the wavelength characteristic control method of optical transmission power by Raman amplifications, as disclosed in Literature 1, controls power of each wavelength light by branching a monitoring light from an output light into a light of a wavelength obtained by adding about 100 nm to a wavelength of each pumping light and monitoring these wavelength lights, it will monitor a light signal whose wavelength is outside of the signal bands, as shown in FIG. 15.

In a case where an amplifier (e.g. EDFA) other than a Raman amplifier is used together, monitoring a signal outside of a signal band results in increasing a loss of the monitoring signal to prevent amplification control from being conducted with high precision, so that it will be difficult to measure an accurate level of the monitoring signal. As a result, controlling an output spectrum within a signal band to be flat will be impossible.

SUMMARY OF THE INVENTION

The object of the present invention is to provide a Raman amplification repeater which enables control of Raman amplification to be simplified and to accordingly enable high-speed control even when a signal spectrum slants in a transmission path due to variation of a transmission path loss caused by a change of environments or the like. The object of the present invention is further to provide a Raman amplification repeater that automatically maintains constant output signal power to control an output spectrum to be flat, and an optical transmission system using the same.

Another object of the present invention is to provide a Raman amplification repeater which, even used together with an amplifier other than a Raman amplifier, enables a loss of a monitoring signal to be suppressed as much as possible to measure a level of the monitoring signal in Raman amplification precisely. Another object of the present invention is to do the above while facilitating selection of wavelengths because a signal light in a signal band is monitored, thereby realizing simplification of manufacturing, and an optical transmission system using the same.

According to the first aspect of the invention, a Raman amplification repeater conducts amplification of signal lights by Raman scattering, which occurs when pumping lights are applied to a transmission path fiber, wherein output power of the pumping light is controlled by monitoring signal light power using signal lights having monitoring wavelengths, whose number is not less than the number of the pumping light wavelengths and not more than the number of signal lights, in a signal band of the signal light.

In the preferred construction, the monitoring wavelength is set to be a peak value or a bottom value of a Raman amplification spectrum in the signal band.

In another preferred construction, the monitoring wavelength is set to be a peak value, or a bottom value, of a Raman amplification spectrum in the signal band. Negative feedback control of the pumping light is conducted by amplifying the signal light of the monitoring wavelength such that power of the spectrum at the monitoring wavelength, which is set to be the bottom value of the Raman amplification spectrum in the signal band, has a target value set in advance.

In another preferred construction, the monitoring wavelength is set to be a peak value, or a bottom value, of a Raman amplification spectrum in the signal band. Negative feedback control of the pumping light is conducted by amplifying the signal light of the monitoring wavelength such that power of the spectrum at the monitoring wavelength, which is set to be the bottom value of the Raman amplification spectrum in the signal band, has a target value set in advance according to a minimum output signal power in the signal band.

In another preferred construction, the monitoring wavelength is set to be a peak value, or a bottom value, of a Raman amplification spectrum in the signal band, and negative feedback control of the pumping light power is conducted by amplifying the signal light of the monitoring wavelength such that power of the spectra at a plurality of the monitoring wavelengths, which are set to be the peak value of the Raman amplification spectrum in the signal band, has no difference.

In another preferred construction, the monitoring wavelength is set to be a peak value, or a bottom value, of a Raman amplification spectrum in the signal band, negative feedback control of the pumping light is conducted by amplifying the signal light of the monitoring wavelength such that power of the spectrum at the monitoring wavelength, which is set to be the bottom value of the Raman amplification spectrum in the signal band, has a target value set in advance, and negative feedback control of the pumping light power is conducted by amplifying the signal light of the monitoring wavelength such that power of the spectra at a plurality of the monitoring wavelengths, which are set to be the peak value of the Raman amplification spectrum in the signal band, has no difference.

In another preferred construction, the monitoring wavelength is set to be a peak value, or a bottom value, of a Raman amplification spectrum in the signal band. Negative feedback control of the pumping light is conducted by amplifying the signal light of the monitoring wavelength such that power of the spectrum at the monitoring wavelength, which is set to be the bottom value of the Raman amplification spectrum in the signal band, has a target value set in advance, the target value being set according to a minimum output signal power in the signal band. Negative feedback control of the pumping light power is conducted by amplifying the signal light of the monitoring wavelength such that power of the spectra at a plurality of the monitoring wavelengths, which are set to be the peak value of the Raman amplification spectrum in the signal band, has no difference.

In another preferred construction, the monitoring wavelength is set at least to be a wavelength at the opposite ends of the signal band, in the vicinity of the opposite ends, or at the center or in the vicinity of the center.

In another preferred construction, the monitoring wavelength is set at least to be a wavelength at the opposite ends of the signal band, in the vicinity of the opposite ends, or at the center or in the vicinity of the center, and negative feedback control is conducted of changing power of the pumping light such that each signal light power monitored by the monitoring wavelength has a control target value.

According to another aspect of the invention, an optical transmission system for transmitting is provided, whereby a Raman amplification repeater conducts amplification of signal lights by Raman scattering which occurs when pumping lights are applied to a transmission path fiber and to the signal light on the optical transmission path, wherein the Raman amplification repeater controls output power of the pumping light by monitoring signal light power by using signal lights having monitoring wavelengths whose number is not less than the number of the pumping light wavelengths and not more than the number of signal lights and which are monitoring wavelengths in a signal band of the signal light.

In the preferred construction, the monitoring wavelength in the Raman amplification repeater is set to be a peak value, or a bottom value, of a Raman amplification spectrum in the signal band.

In another preferred construction, the monitoring wavelength in the Raman amplification repeater is set to be a peak value, or a bottom value, of a Raman amplification spectrum in the signal band, and the Raman amplification repeater conducts negative feedback control of the pumping light by amplifying the signal light having the monitoring wavelength such that power of the spectrum at the monitoring wavelength, which is set to be the bottom value of the Raman amplification spectrum in the signal band, has a target value set in advance.

In another preferred construction, the monitoring wavelength in the Raman amplification repeater is set to be a peak value, or a bottom value, of a Raman amplification spectrum in the signal band, and the Raman amplification repeater conducts negative feedback control of the pumping light by amplifying the signal light having the monitoring wavelength such that power of the spectrum at the monitoring wavelength, which is set to be the bottom value of the Raman amplification spectrum in the signal bands, has a target value set in advance, the target value being set according to a minimum output signal power in the signal band.

In another preferred construction, the monitoring wavelength in the Raman amplification repeater is set to be a peak value, or a bottom value, of a Raman amplification spectrum in the signal band, and the Raman amplification repeater conducts negative feedback control of the pumping light power by amplifying the signal light having the monitoring wavelength such that power of the spectra at a plurality of the monitoring wavelengths, which are set to be the peak value of the Raman amplification spectrum in the signal bands has no difference.

In another preferred construction, the monitoring wavelength in the Raman amplification repeater is set to be a peak value, or a bottom value, of a Raman amplification spectrum in the signal band, the Raman amplification repeater conducts negative feedback control of the pumping light by amplifying the signal light having the monitoring wavelength such that power of the spectrum at the monitoring wavelength, which is set to be the bottom value of the Raman amplification spectrum in the signal band, has a target value set in advance. The Raman amplification repeater conducts negative feedback control of the pumping light power by amplifying the signal light having the monitoring wavelength such that power of the spectra at a plurality of the monitoring wavelengths, which are set to be the peak value of the Raman amplification spectrum in the signal bands has no difference.

In another preferred construction, the monitoring wavelength in the Raman amplification repeater is set to be a peak value or a bottom value of a Raman amplification spectrum in the signal band, the Raman amplification repeater conducts negative feedback control of the pumping light by amplifying the signal light having the monitoring wavelength such that power of the spectrum at the monitoring wavelength, which is set to be the bottom value of the Raman amplification spectrum in the signal band, has a target value set in advance, the target value being set according to a minimum output signal power in the signal band. The Raman amplification repeater conducts negative feedback control of the pumping light power by amplifying the signal light having the monitoring wavelength such that power of the spectra at a plurality of the monitoring wavelengths, which are set to be the peak value of the Raman amplification spectrum in the signal bands, has no difference.

In another preferred construction, the monitoring wavelength in the Raman amplification repeater is set at least to be a wavelength at the opposite ends of the signal band, in the vicinity of the opposite ends, or at the center or in the vicinity of the center.

In another preferred construction, the monitoring wavelength in Raman amplification repeater is set at least to be a wavelength at the opposite ends of the signal band, in the vicinity of the opposite ends, or at the center or in the vicinity of the center, and the Raman amplification repeater conducts negative feedback control of changing power of the pumping light such that each signal light power monitored by the monitoring wavelength has a control target value.

According to another aspect of the invention, a Raman amplification control method is provided in which a Raman amplification repeater conducts amplification of signal lights by Raman scattering which occurs when pumping lights are applied to a transmission path fiber. The method involves controlling output power of the pumping light by monitoring signal light power using signal lights having monitoring wavelengths whose number is not less than the number of the pumping light wavelengths and not more than the number of signal lights, in a signal band of the signal light.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 8 is a diagram showing a spectrum of a signal light obtained at the signal output point because of variation of a transmission path loss caused by a change of environments or the like;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order not to obscure the present invention.

In the following, preferred embodiments of the present invention will be described in detail with reference to the drawings.

(First Embodiment)

Figure 1:
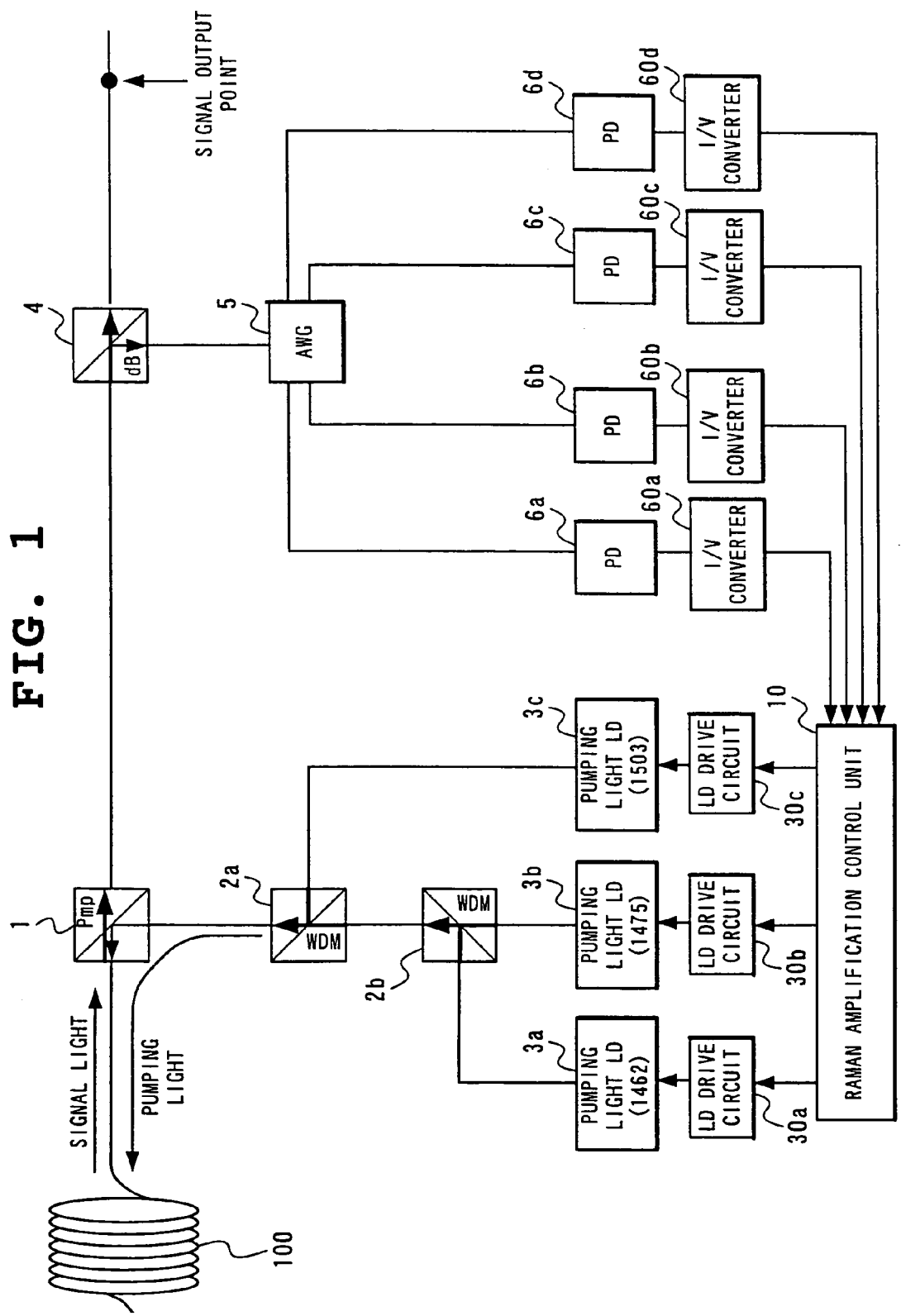
FIG. 1 is a block diagram showing a structure of an optical transmission system to which a Raman amplification repeater according to a first embodiment of the present invention is applied.

FIG. 1 is a block diagram showing a structure of an optical transmission system to which a Raman amplification repeater is applied. The system uses the function of signal light amplification caused by Raman scattering when a pumping light LD is applied to a transmission path fiber according to a first embodiment of the present invention. transmission path fiber according to a first embodiment of the present invention.

(Structure of Embodiment)

With reference to FIG. 1, the Raman amplification repeater according to the first embodiment includes a pumping light WDM (Wavelength Division Multiplex) coupler 1, WDM couplers 2a and 2b, pumping light LDs (Laser Diode) 3a, 3b and 3c, a branch coupler 4, an AWG (Arrayed Waveguide Grating) 5, PDs (Photo Diode) 6a, 6b, 6c and 6d, LD drive circuits 30a, 30b and 30c, I/V converters 60a, 60b, 60c and 60d, and a Raman amplification control unit 10.

The Raman amplification repeater according to the present embodiment, as illustrated in FIG. 1, has a structure in which the number of the PDs 6a, 6b, 6c and 6d for monitoring is larger than that of the pumping light LDs 3a, 3b an 3c, that is, the number of monitoring wavelengths is larger than the number of pumping light wavelengths.

The pumping light LDs 3a, 3b and 3c, which are light sources that output pumping lights whose wavelengths are different in order to amplify a signal light, are multiplexed by the WDM couplers 2a and 2b which multiplex lights having different wavelengths.

The pumping light WDM coupler 1 is a unit which multiplexes a signal light on an optical transmission path 100 and the pumping lights, and the pumping lights are multiplexed with the signal light in the reverse direction to each other and output to the optical transmission path 100. The branch coupler 4 branches an applied signal light by a certain ratio.

The AWG 5 is an array of waveguides which is used for dividing a bundle of lights into lights of a plurality of wavelengths.

The PDs 6a, 6b, 6c and 6d convert light signals into electric signals and receive the same. Based on signals received by the PDs 6a, 6b 6c and 6d, the Raman amplification control unit 10 controls pumping light power of the pumping light LDs 3a, 3b and 3c.

The I/V converters 60a, 60b, 60c and 60d convert current signals which have been converted by the PDs 6a, 6b, 6c and 6d into voltage signals.

The Raman amplification control unit 10 receives input of an electric signal output from the PDs 6a, 6b, 6c and 6d. And the Raman amplification control unit 10 controls the LD drive circuits 30a, 30b and 30c of the pumping light LDs 3a, 3b and 3c according to a value of the received electric signal so as to obtain a flat output signal, thereby adjusting pumping light power as will be described later.

The Raman amplification control unit 10 is realized by a program-controlled CPU or the like.

(Operation of First Embodiment)

Next, operation of thus structured Raman amplification repeater according to the first embodiment will be described with reference to the drawings.

In FIG. 1, wavelengths of the pumping light LDs 3a, 3b and 3c are 1462.4 nm, 1475.0 nm and 1503.1 nm and the signal wavelength band ranges from 1574 to 1609 nm. Branch ratio of the branch coupler 4 is 13 dB and an insertion loss of the pumping light WDM coupler 1 is 0.5 dB and an insertion loss of the AWG 5 is 3.5 dB.

Figure 4:
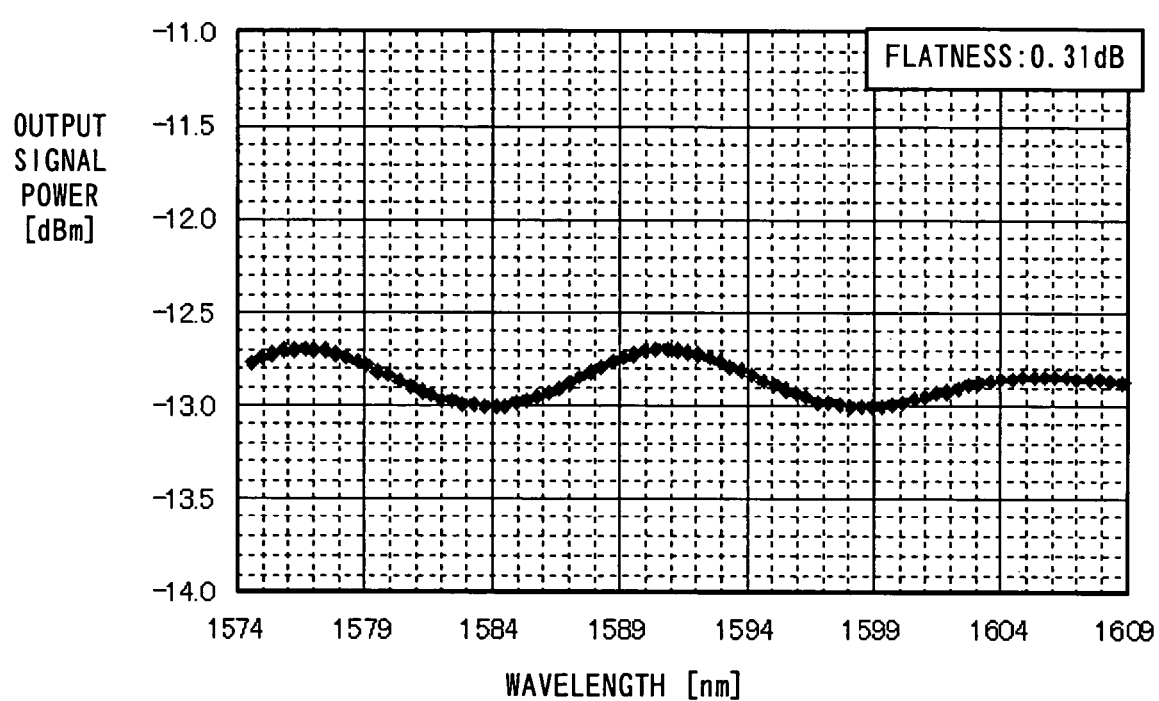
FIG. 4 is a diagram showing an output spectrum obtained when amplification control is conducted by the Raman amplification repeater according to the first embodiment in a case where the signal light having the spectrum illustrated in FIG. 2 enters.

Signal light wavelengths received by the PDs 6a, 6b, 6c and 6d are each a peak value or a bottom value of a Raman amplification spectrum in a signal band and in a case, for example, of the output spectrum of Raman amplification shown in FIG. 4, 1576.6 nm (peak value), 1583.7 nm (bottom value), 1590.8 nm (peak value) and 1598.5 nm (bottom value), that is, the peak values or the bottom values will be signal light wavelengths to be monitored.

Figure 2:
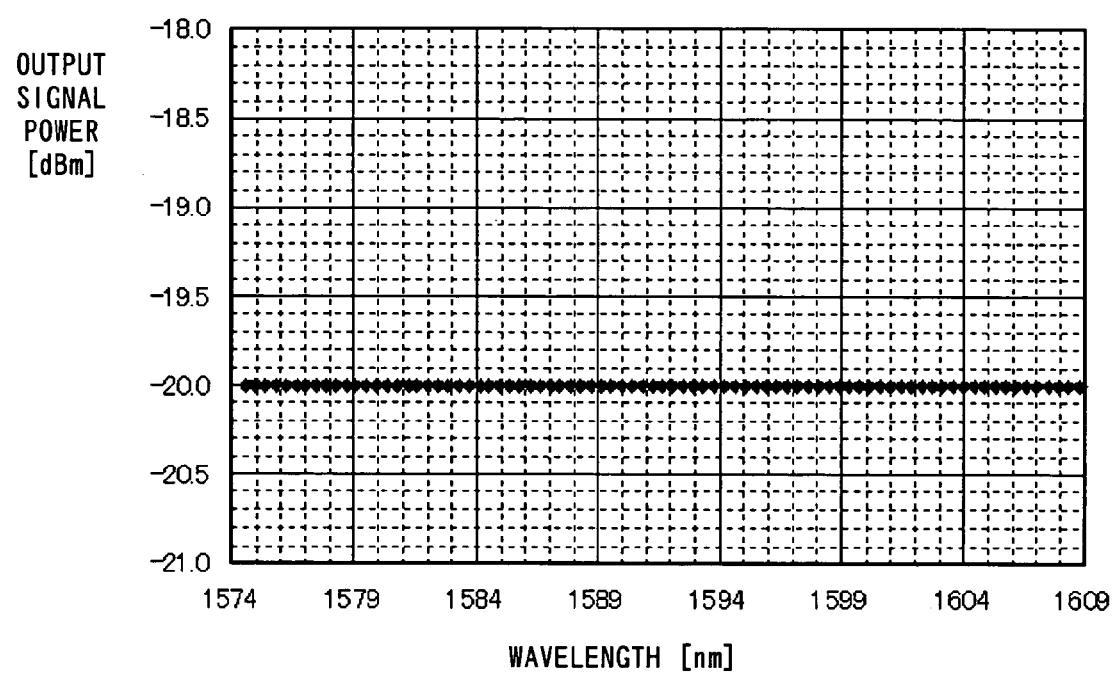
FIG. 2 is a diagram showing a spectrum of a signal light obtained at a signal output point on an optical transmission path when no Raman amplification is conducted.

First, consideration will be given to a case where the signal light whose spectrum is shown in FIG. 2 is obtained at the signal output point on the optical transmission path 100 when no Raman amplification is conducted.

The signal light having the wavelength of 1576.6 nm among signal lights branched by the branch coupler 4 passes through the AWG 5 to become a signal light whose signal power is −37 dBm which will be received by the PD 6a.

Similarly, the respective signal lights having the wavelengths of 1583.7 nm, 1590.8 nm and 1598.5 nm become signal lights whose signal power is −37 dBm which will be received by the PD 6b, the PD 6c and the PD 6d, respectively.

Next, consideration will be given to a case where the pumping light LDs 3a, 3b and 3c are driven to obtain the minimum output signal power of −13 dBm in the signal band at the signal output point on the optical transmission path 100. At this time, assume that a Raman gain is 7 dB ((minimum output signal power at the time of Raman amplification)−(output signal power at the time when no Raman amplification is conducted)).

A pumping light emitted onto the optical transmission path 100 is assumed to amplify, in the optical transmission path 100, a signal light band about 13.2 THz apart from the pumping light.

The Raman-amplified signal light having the wavelength of 1576.6 nm is received by the PD 6a. Similarly, the signal lights having the wavelengths of 1583.7 nm, 1590.8 nm and 1598.5 nm are also Raman-amplified and received by the PDs 6b, 6c and 6d, respectively.

Since the present embodiment employs three wavelengths for a pumping light, an output signal spectrum can be controlled to be flatter than that in a case where signal light values of four wavelengths are used.

Description will be made of contents of control at the Raman amplification control unit 10.

A monitoring signal for controlling each pumping light power is set not to be a peak value of a gain which is about 13.2 THz apart from the pumping light wavelength but to be a peak value or a bottom value of a Raman amplification spectrum within a signal band in view of practicality.

Since the signal lights of 1583.7 n=and 1598.5 nm monitored by the PD 6b and the PD 6d are 13.95 THz and 11.9 THz apart from the wavelengths of the pumping light LD 3b and LD 3c, respectively, to be wavelengths at which the minimum output signal power in the signal band is obtained, control target values will be −13 dBm−17 dB=−30 dBm (difference between signal levels received at the signal output point and at each PD=17 dB).

At this time, conduct simple negative feedback control of changing pumping light power of the pumping light LD 3b such that each signal light power monitored by the PD 6b attains the control target value and changing pumping light power of the pumping light LD 3c such that each signal light power monitored by the PD 6d attains the control target value.

The signal lights of 1576.6 nm and 1590.8 nm monitored by the PD 6a and the PD 6c are 14.85 THz and 16.55 THz apart from the wavelength of the pumping light LD 3a, respectively, to be wavelengths at which the maximum output signal power in the band is obtained.

Since by conducting control such that output signal powers of the signal lights of the two wavelengths coincide with each other, a flat output spectrum can be obtained in the signal band, the control target value will be 0 dB as a difference between the PD 6a and the PD 6c. Accordingly, conduct negative feedback control of increasing pumping light power of the pumping light LD 3a when the values of the PD 6a and the PD 6c hold the relationship (PD 6a<PD 6c) and reducing pumping light power of the pumping light LD 3a when (PD 6a>PD 6c) holds such that the difference between the PD 6a and the PD 6c attains 0 dB.

Figure 3:
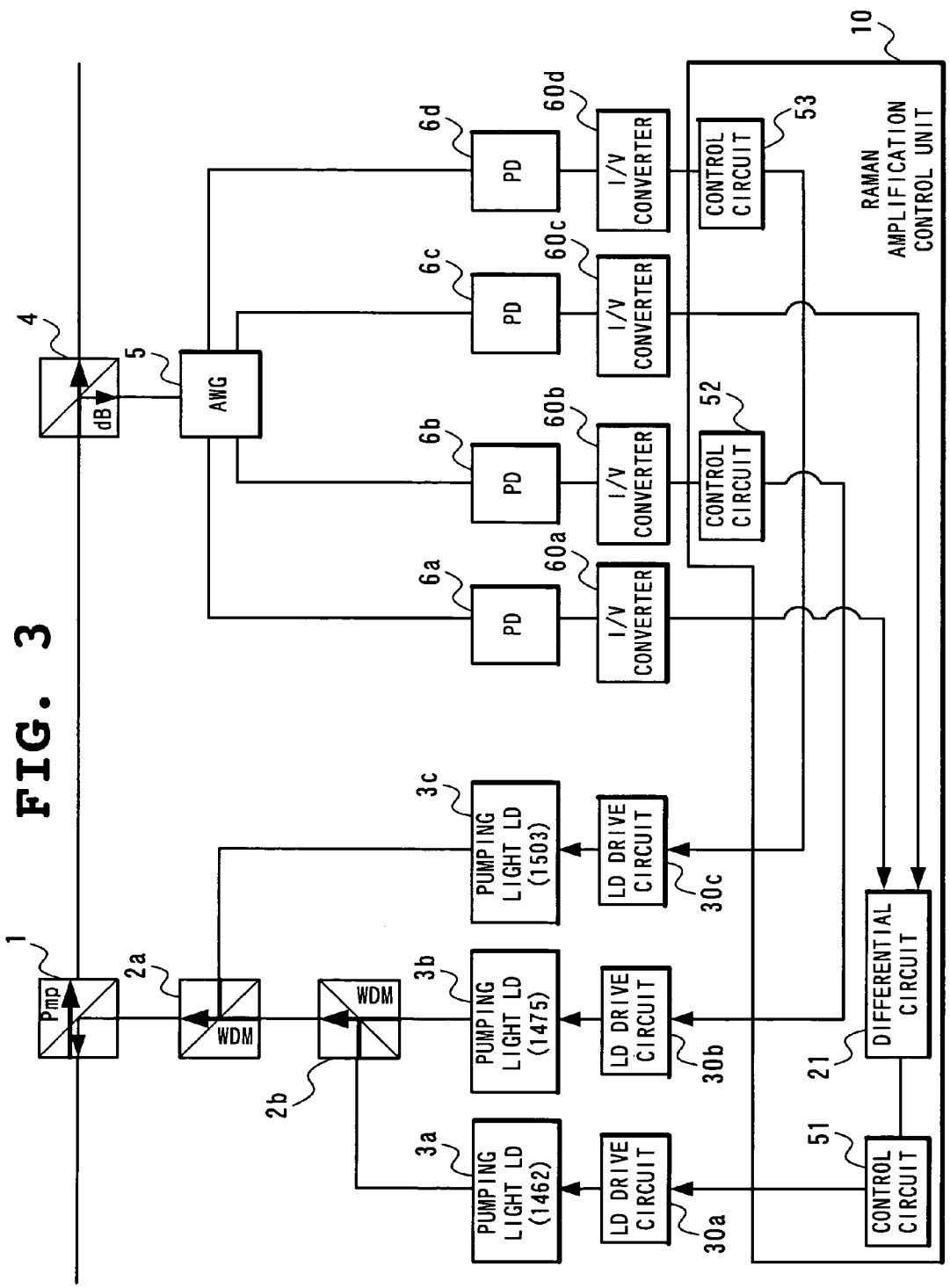
FIG. 3 is a block diagram showing an example of structure of a Raman amplification control unit of the Raman amplification repeater according to the first embodiment of the present invention.

FIG. 3 is a block diagram showing an example of structure of the Raman amplification control unit 10 realizing the above-described control, which includes a control unit 51, a differential circuit 21, and a control unit 52 and a control unit 53.

The control unit 52 and the control unit 53 conduct simple negative feedback control of changing pumping light power of the pumping light LD 3b and the pumping light LD 3c such that each signal light power monitored by the PD 6b and the PD 6d attains a control target value.

In addition, by obtaining a difference between outputs of the PD 6a and the PD 6c by the differential circuit 21, conduct negative feedback control, by the control unit 51, of increasing pumping light power of the pumping light LD 3a when the values of the PD 6a and the PD 6c hold the relationship (PD 6a<PD 6c) and reducing the pumping light power of the pumping light LD 3a when (PD 6a>PD 6c) holds so as to make the difference between the outputs at the PD 6a and the PD 6c be 0 dB.

FIG. 4 shows an output spectrum at the signal output point of the Raman amplification repeater according to the first embodiment. It can been seen that by conducting simple negative feedback control of output power of each pumping light LD according to a monitoring signal wavelength in a manner as described above such that each signal light power monitored by the PDs 6a, 6b, 6c and 6d attains a control target value, an output spectrum is obtained whose lowest output signal power is −13 dBm and whose flatness is not more than 0.31 dB in the signal wavelength band.

Figure 5:
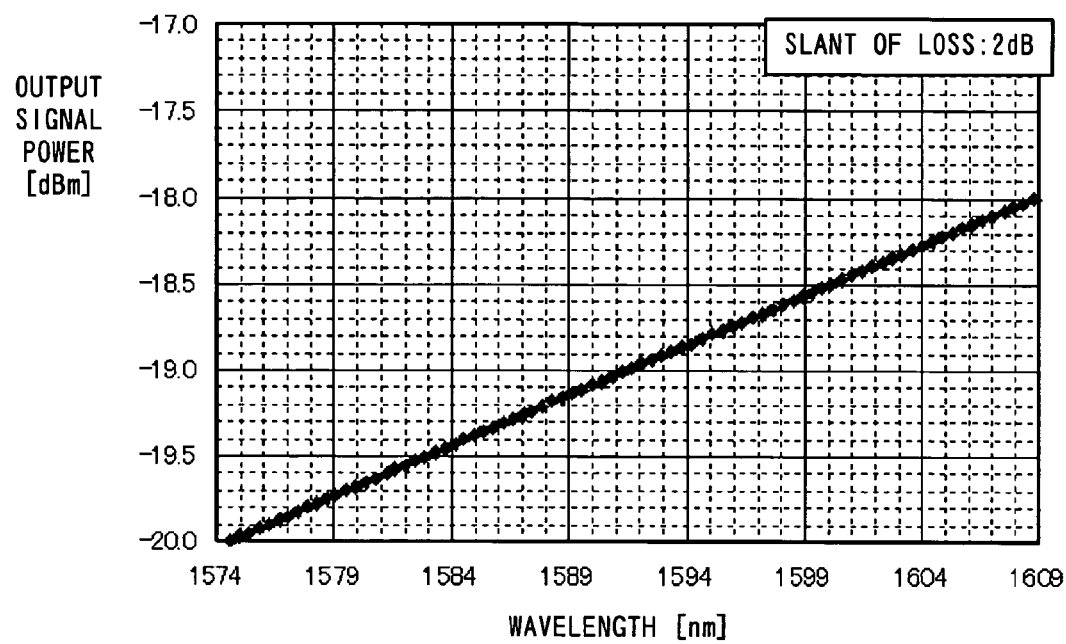
FIG. 5 is a diagram showing a spectrum of a signal light obtained at the signal output point due to effects of Raman tilt occurring in the transmission path.

Next, consideration will be made of a case where due to the effect of Raman tilt occurring in the transmission path, a signal light having a spectrum shown in FIG. 5 is obtained at the signal output point.

Figure 6:
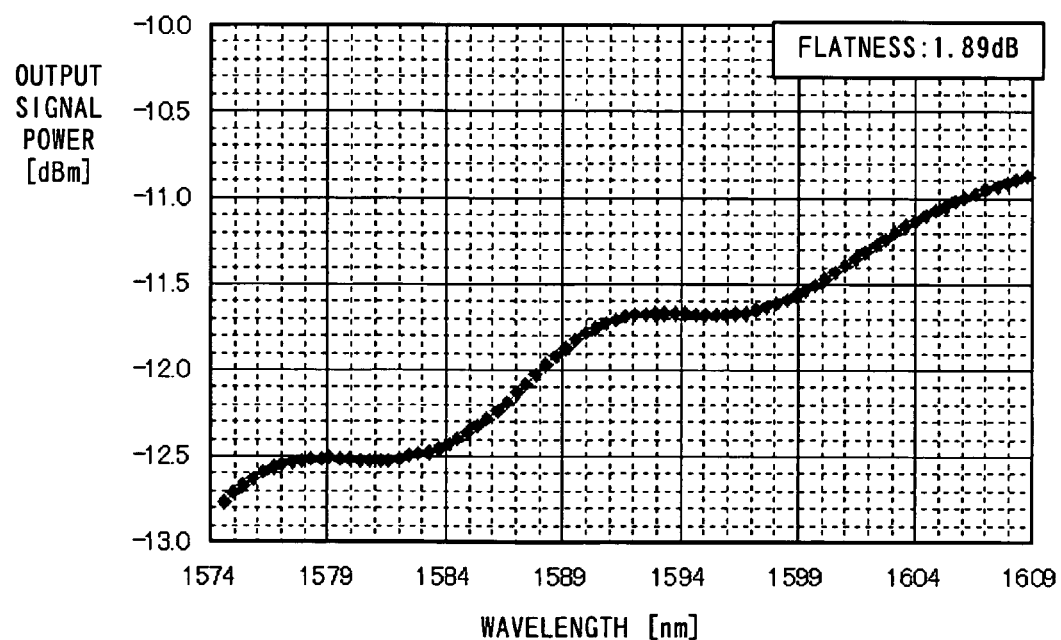
FIG. 6 is a diagram showing a spectrum of a signal light emitted at the signal output point from the Raman amplification repeater according to the present embodiment at the instant when the signal light having the spectrum shown in FIG. 5 is emitted from the signal output point.

First, at the instant when the signal light having the spectrum shown in FIG. 5 is emitted from the signal output point, a signal light having a spectrum shown in FIG. 6 is emitted at the signal output point in the Raman amplification repeater according to the present embodiment.

At this time, PD 6b receives signal light having the wavelength of 1583.7 nm and attains −28.46 dBm, and PD 6d receives signal light having the wavelength of 1598.5 nm and attains −27.59 dBm, which deviate from the control target value. Here, controlling pumping light power of the pumping light LD 3b and the pumping light LD 3d is preferred such that signal light powers of the wavelengths 1583.7 nm and 1598.5 nm received by PD 6b and PD 6d help both attain −30 dBm.

In addition, since the signal light power received by PD 6a and PD 6c holds the relationship (PD 6a<PD 6c), then controlling output power of the pumping light LD 3a and the pumping light LD 3c such that the difference between PD 6a and PD 6c returns to the control target value of 0 dB, which results in the signal light power of the wavelengths of 1583.7 nm and 1598.5 nm attaining −13 dBm at the signal output point, and the signal light power of the wavelengths of 1576.4 nm and 1590.8 nm attaining −12.64 dBm.

Figure 7:
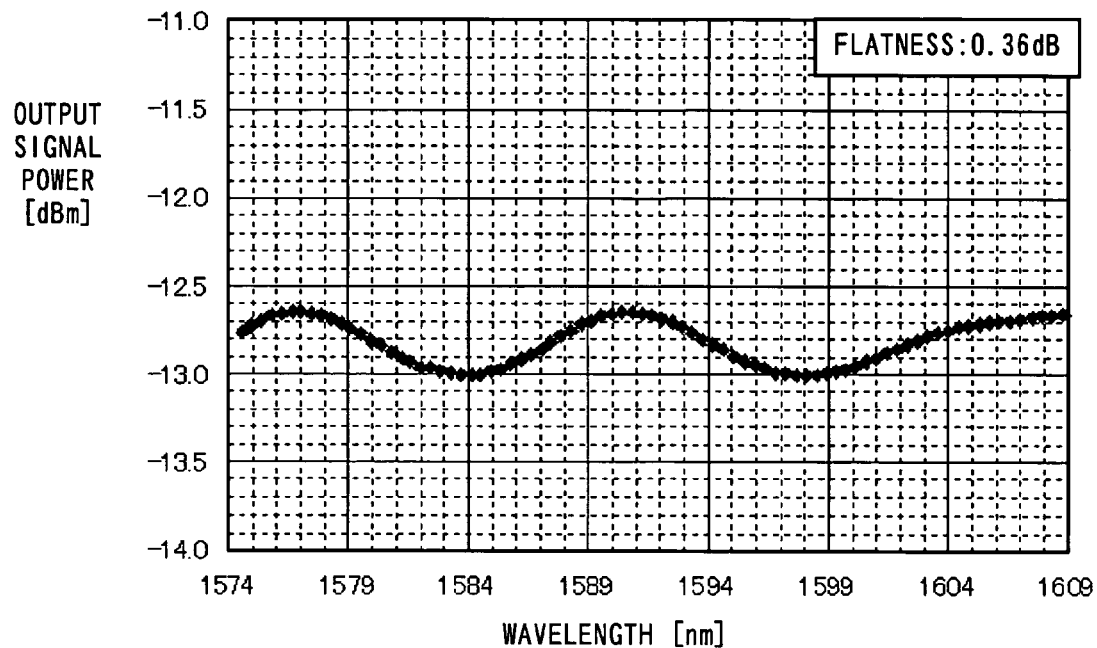
FIG. 7 is a diagram showing a spectrum of a signal light when Raman amplification control according to the present embodiment is conducted with respect to the signal light having the spectrum shown in FIG. 6.

Simple negative feedback control of each pumping light LD simplifies Raman amplification control to enable high-speed control, thereby enabling an output spectrum to be automatically controlled to be flat even when a signal spectrum tilts in the transmission path. Output spectrum at the signal output point is shown in FIG. 7, which is obtained when Raman amplification control according to the present embodiment is conducted with respect to the signal light having the spectrum illustrated in FIG. 6. It can be seen that the lowest output signal power of −13 dBm and the flatness of 0.36 dB in the band are obtained.

Figure 8:
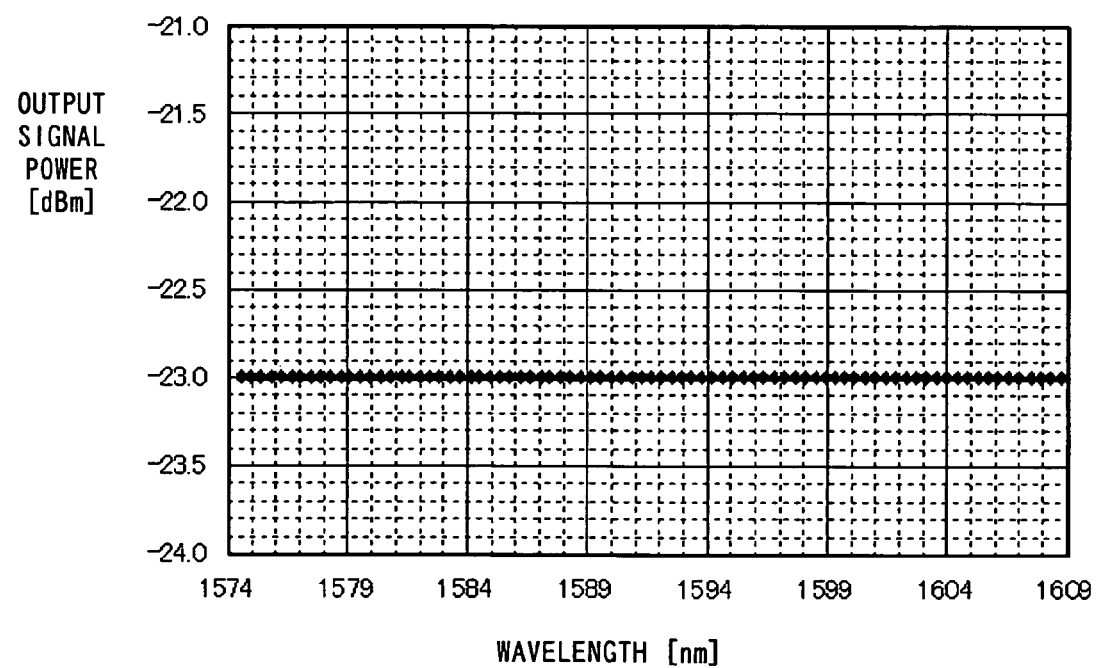

Further consideration will be made of a case where a signal light having a spectrum shown in FIG. 8 is obtained at the signal output point because of variation of a transmission path loss caused by a change of environments or the like.

Figure 9:
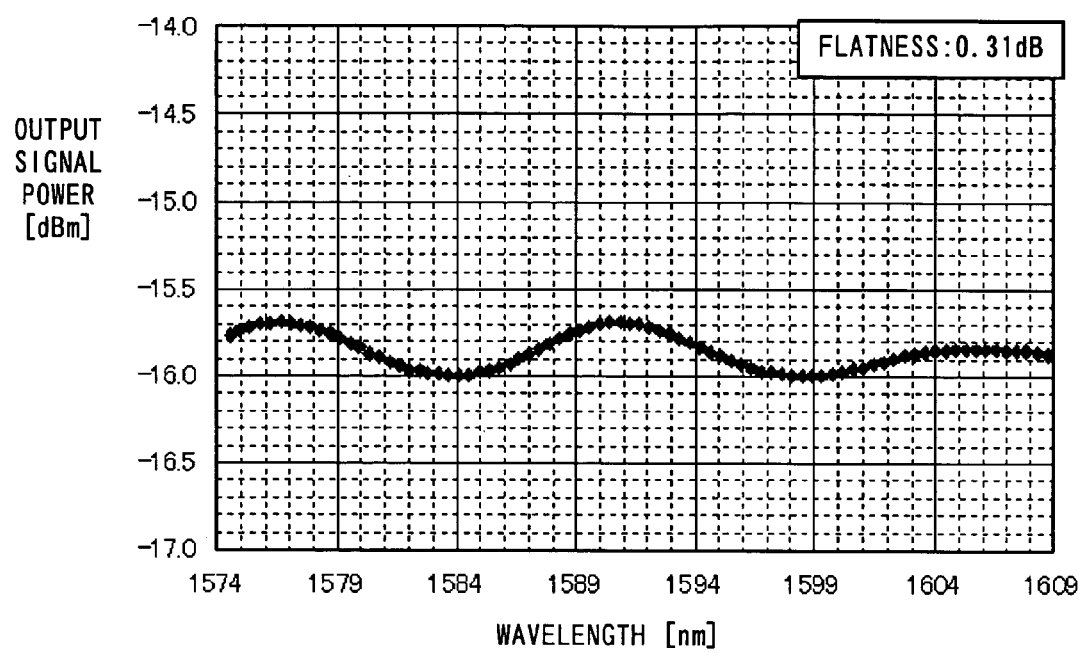
FIG. 9 is a diagram showing a spectrum of a signal light emitted at the signal output point from the Raman amplification repeater according to the present embodiment at the instant when the signal light having the spectrum shown in FIG. 8 is emitted from the signal output point.

At the instant when the signal light having the spectrum shown in FIG. 8 is emitted from the signal output point, a signal light having a spectrum shown in FIG. 9 is emitted at the signal output point in the Raman amplification repeater according to the present invention.

At this time, the values of the PD 6b and the PD 6d which receive the signal lights having the wavelengths of 1583.7 nm and 1598.5 nm attain −32 dBm, which deviates from the control target value. Here, control output power of the pumping light LD 3b and the pumping light LD 3d such that signal light powers received by the PD 6b and the PD 6d both attain −30 dBm.

In addition, controlling output power of the pumping light LD 3a and the pumping light LD 3c such that the difference between the signal light powers received by the PD 6a and the PD 6c attains the control target value of 0 dB results in that signal light power of the wavelengths of 1583.7 nm and 1598.5 nm at the signal output point attains −13 dBm and signal light power of the wavelengths of 1576.4 nm and 1590.8 nm attains −12.56 dBm.

Figure 10:
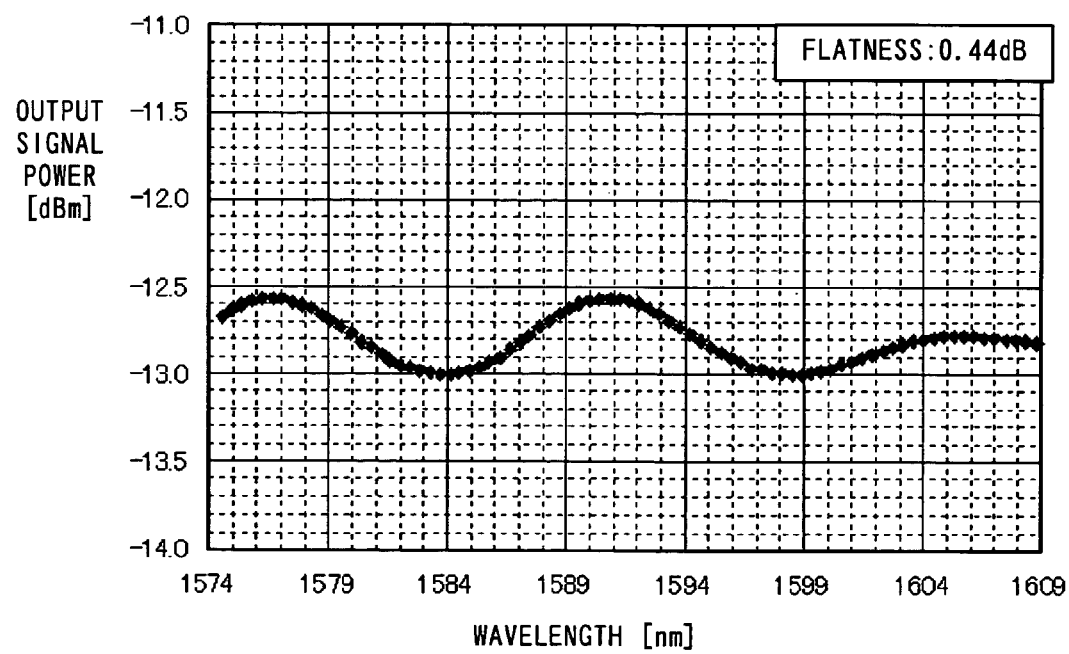
FIG. 10 is a diagram showing a spectrum of a signal light when Raman amplification control according to the present embodiment is conducted with respect to the signal light having the spectrum shown in FIG. 9.

Simple negative feedback control of each pumping light LD simplifies Raman amplification control to enable high-speed control, thereby enabling output signal power to be automatically controlled to be a fixed value and an output spectrum to be controlled to be flat even when a loss varies in the transmission path. Output spectrum at the signal output point is shown in FIG. 10, which is obtained when Raman amplification control according to the present embodiment is conducted with respect to the signal light having the spectrum illustrated in FIG. 9. It can be seen that the lowest output signal power of −13 dBm and the flatness of 0.44 dB in the band are obtained.

In conventional art, when monitoring a signal outside of a signal band, in a case where an amplifier other than a Raman amplifier is used together, a loss is too large to amplify a signal light properly, so that it is difficult to measure a precise level of the monitoring signal, while according to above-described first embodiment, in order to control each pumping light LD, by monitoring not a peak value of a gain about 13.2 THz apart from the pumping light wavelength but output signal light power of a few waves in the signal band in view of practicality, a monitoring signal level can be precisely detected at the time of Raman amplification and monitoring a signal light in the signal band facilitates wavelength selection to simplify manufacturing.

Moreover, because control is possible by simple negative feedback control, control of the Raman amplifier is simplified to enable high-speed control accordingly, so that even when a transmission path loss varies due to a change of environments or when a signal spectrum tilts in the transmission path, output signal power can be automatically maintained to be a fixed value and an output spectrum in the signal band can be controlled to be flat.

(Second Embodiment)

Raman amplification repeater according to the second embodiment of the present invention will be described in detail with reference to FIG. 11.

Figure 11:
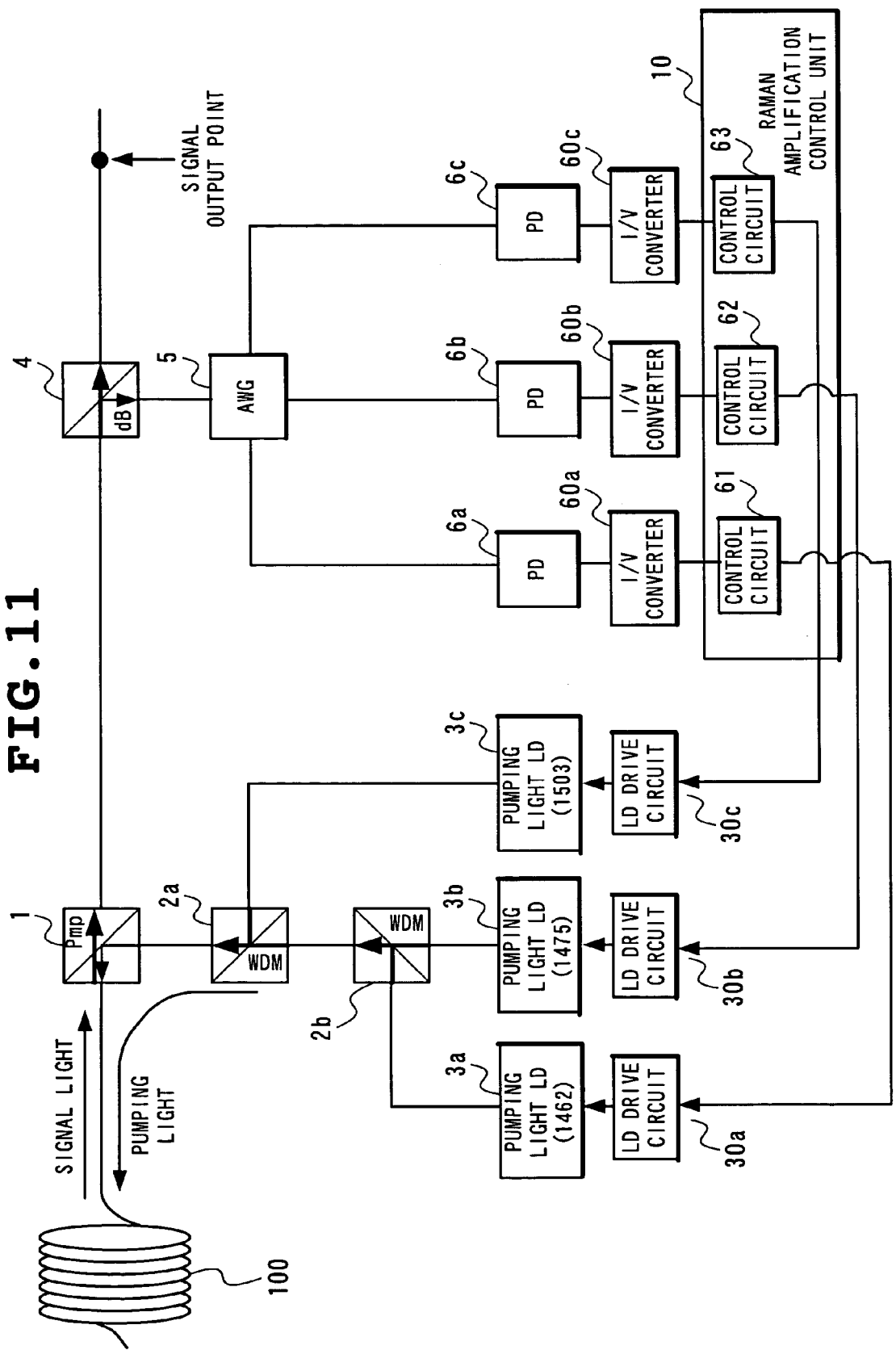
FIG. 11 is a block diagram showing a structure of an optical transmission system to which a Raman amplification repeater according to a second embodiment of the present invention is applied.

FIG. 11 is a block diagram showing a structure of an optical transmission system to which the Raman amplification repeater according to the second embodiment of the present invention is applied.

With reference to FIG. 11, the Raman amplification repeater according to the second embodiment includes a pumping light WDM (Wavelength Division Multiplex) coupler 1, WDM couplers 2a and 2b, pumping light LDs (Laser Diode) 3a, 3b and 3c, a branch coupler 4, an AWG (Arrayed Waveguide Grating) 5, PDs (Photo Diode) 6a, 6b and 6c, LD drive circuits 30a, 30b and 30c, I/V converters 60a, 60b and 60c, and a Raman amplification control unit 10.

The Raman amplification repeater according to the present embodiment, as illustrated in FIG. 11, has a structure in which the number of the pumping light LDs 3a, 3b an 3c is the same as that of the PDs 6a, 6b and 6c for monitoring, that is, the number of pumping light wavelengths is the same as the number of monitoring wavelengths.

The Raman amplification repeater according to the second embodiment differs from the first embodiment in that the number of PDs for monitoring is three and that the Raman amplification control unit 10 is formed of control units 61, 62 and 63 which control the LD drive circuits 30a, 30b and 30c of the pumping light LDs 3a, 3b and 3c to adjust pumping light power, respectively. Components common to those of the first embodiment are referenced by the same numerals.

(Operation of Second Embodiment)

Wavelengths of the pumping light LDs 3a, 3b and 3c are 1462.4nm, 1475.0 nm and 1503.1 nm, respectively, and the signal wavelength band ranges from 1574 to 1609 nm. Branch ratio of the branch coupler 4 is 13 dB and an insertion loss of the pumping light WDM coupler 1 is 0.5 dB and an insertion loss of the AWG 5 is 3.5 dB.

Signal light wavelengths received by the PDs 6a, 6b and 6c are values at the opposite ends (or values in proximity to the opposite ends) and in the center (at the center or a value in proximity to the center) of the signal band. In the illustrated case, for example, the wavelengths are 1574.54 nm (value at the left end), 1591.26 nm (value at the center) and 1608.76 nm (value at the right end).

First, consideration will be made of a case where when no Raman amplification is conducted, the signal light having the spectrum shown in FIG. 2 is obtained at the signal output point of the optical transmission path 100.

The signal light of 1574.54 nm branched by the branch coupler 4 passes through the AWG 5 and is received by the PD 6a with its signal power attaining 36 dBm. Similarly, the signal lights having the wavelengths of 1591.26 nm and 1608.76 nm are respectively received by the PD 6b and the PD 6c with their signal power attaining −37 dBm.

Next, consideration will be made of a case where the pumping light LDs 3a, 3b and 3c are driven to have the minimum output signal power in the signal band attaining −13 dBm at the signal output point. At this time, assume that the Raman gain is 7 dB ((minimum signal power when Raman amplification is conducted)−(signal power when no Raman amplification is conducted)).

Pumping light emitted onto the optical transmission path 100 amplifies a signal light band about 13.2 THz apart from the pumping light in the optical transmission path 100. The Raman-amplified signal light having the wavelength of 1574.54 nm is received by the PD 6a. Similarly, the signal lights having the wavelengths of 1591.26 nm and 1608.76 nm are also Raman-amplified and received by the PDs 6a and 6c, respectively.

In the present embodiment, by using values of signal lights of three wavelengths, as many as the number of wavelengths of the pumping lights, an output signal spectrum is controlled to be flat.

Monitoring signal for controlling each pumping light power is set not to be a peak value of a gain about 13.2 THz apart from the pumping light wavelength but to be at the opposite ends and at the center of the signal band in view of practicality.

The signal lights of 1574.54 nm and 1608.76 nm monitored by the PD 6a and the PD 6c are 14.55 THz and 13.05 THz apart from the wavelengths of the pumping light LD 3a and LD 3c, respectively, and their control target values are both −13 dBm−17 dB=−30 dBm (difference between signal levels received at the signal output point and at each PD=17 dB).

At this time, by the control unit 61 and the control unit 63, conduct simple negative feedback control of changing pumping light power of the pumping light LD 3a such that each signal light power monitored by the PD 6a attains the control target value and changing pumping light power of the pumping light LD 3c such that each signal light power monitored by the PD 6c attains the control target value.

In addition, 1591.26 nm monitored by the PD 6b is 14.85 THz apart from the wavelength of the pumping light LD 3b. Since the wavelength monitored by the PD 6b is the wavelength at the center of the signal band and according to common evaluation data, it is found that a flat gain is obtained in a signal band by controlling output power at this wavelength to be higher by the Raman gain×0.01, set a control target value to be −37 dBm+7 dB+7 dB×0.01=−29.93 dBm. Then, the control unit 62 conducts negative feedback control of changing pumping light power of the pumping light LD 3b such that each signal light power monitored by the PD 6b attains the control target value.

Figure 12:
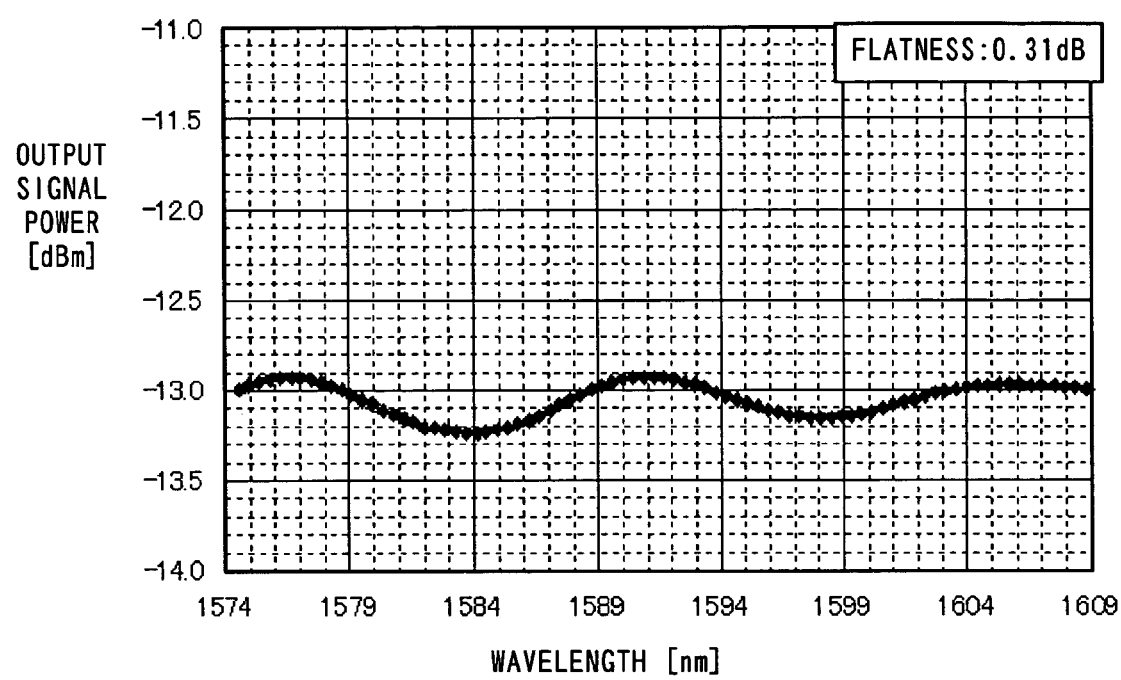
FIG. 12 is a diagram showing an output spectrum obtained when amplification control is conducted by the Raman amplification repeater according to the second embodiment in a case where the signal light having the spectrum illustrated in FIG. 2 enters.
Figure 13:
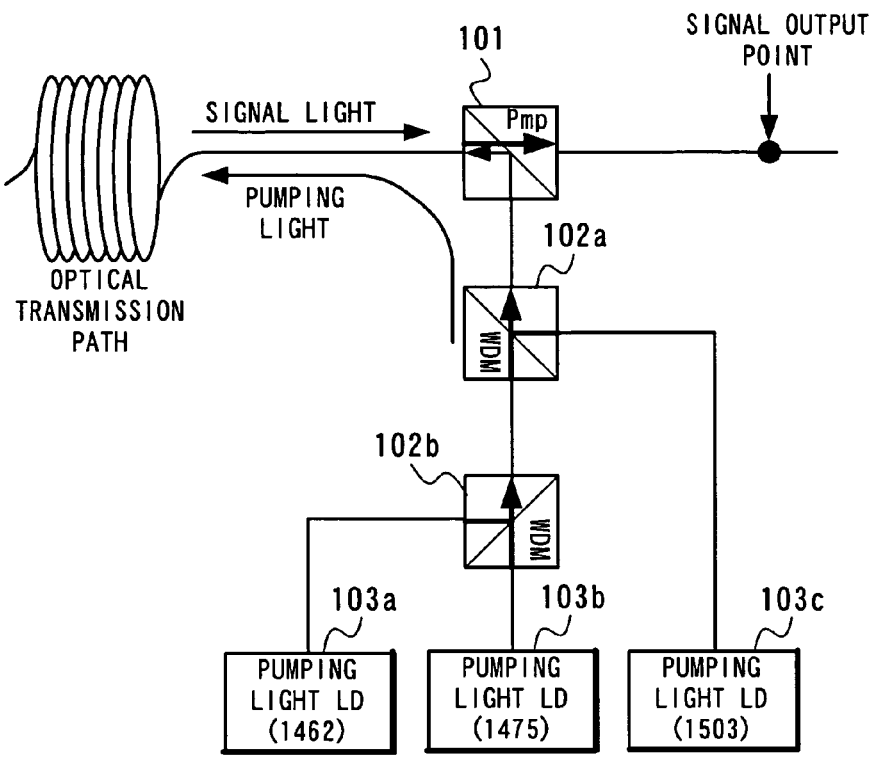
FIG. 13 is a block diagram showing one example of a structure of a conventional Raman amplification repeater.
Figure 14:
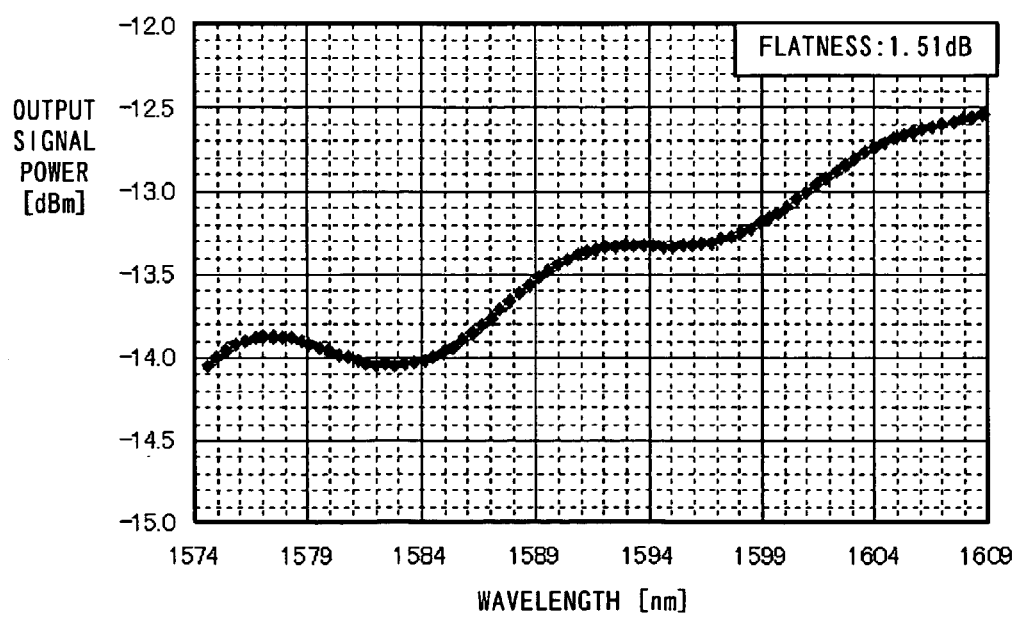
FIG. 14 is a diagram showing an output spectrum obtained when Raman amplification is conducted by the conventional Raman amplification repeater.
Figure 15:
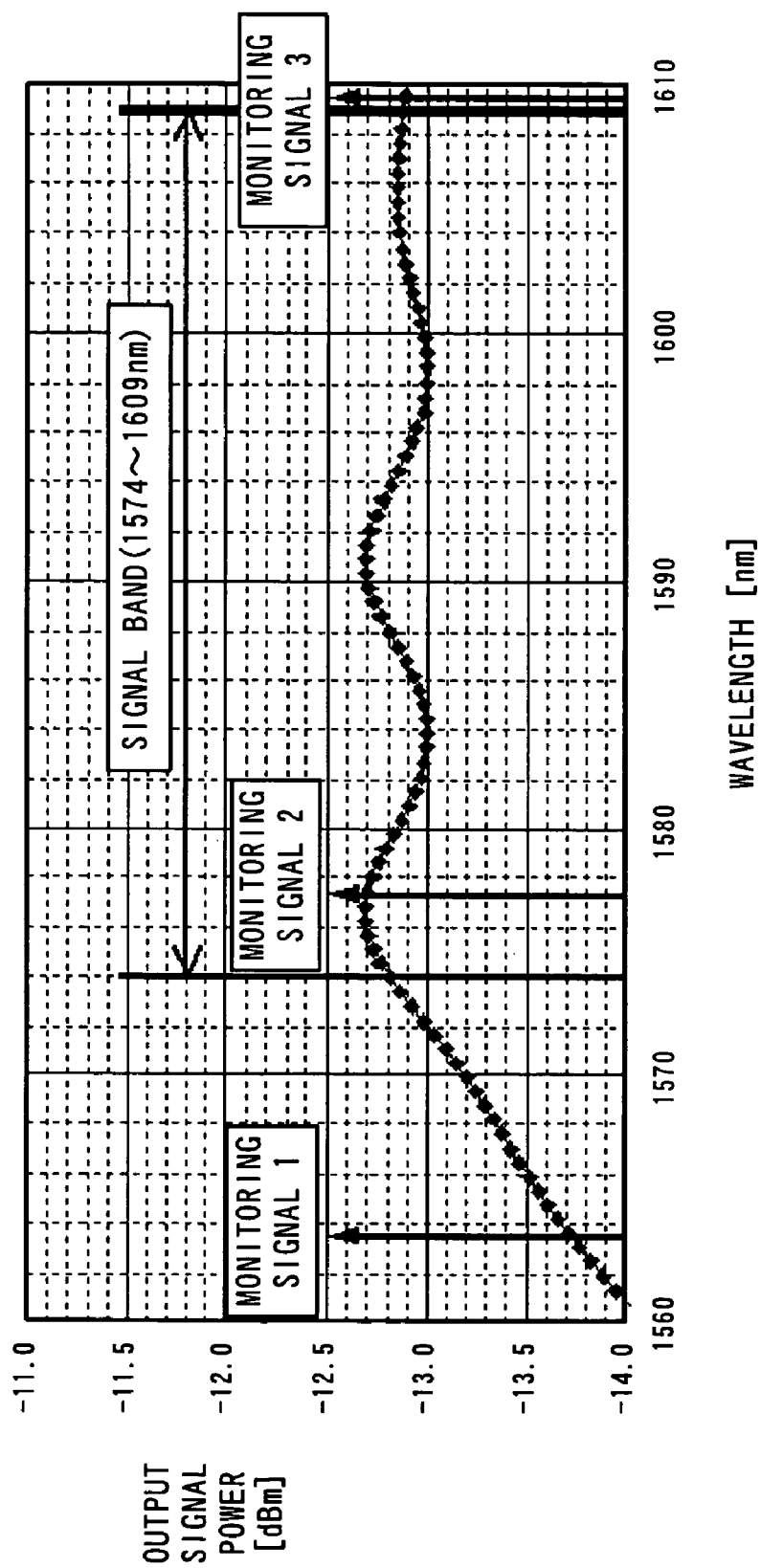
FIG. 15 is a diagram showing an example of a conventional case where a light signal whose wavelength is outside of a signal band is monitored.

Output spectrum is shown in FIG. 12, which is obtained at the signal output point when Raman amplification control according to the present embodiment is conducted with respect to the signal light having the spectrum shown in FIG. 2. It can be seen that an output spectrum whose flatness is not more than 0.31 dB is obtained by conducting, such that each signal light power monitored by the PDs 6a, 6b and 6c attains a control target value, simple negative feedback control of each pumping light LD output power according to the monitoring signal wavelength.

Although the present invention has been described with respect to the preferred embodiments in the foregoing, the present invention is not always limited to the above-described embodiments and can be embodied in various forms within the range of its technical idea.

Although the first and second embodiments employ three different pumping light wavelengths of 1462.4 nm, 1475.0 nm and 1503.1 nm, the present invention can be realized also by changing a pumping light wavelength and the number of pumping light wavelengths.

While the first and second embodiments employ a signal light for controlling a pumping light LD, the present invention can be realized also by using a monitoring signal which is separate from a signal light.

Although in the first and second embodiments, signal lights of three or four wavelengths are monitored by the PDs to control pumping light LDs having different wavelengths, the present invention is not limited to the number of wavelengths according to the embodiments as long as the number of signal lights monitored by the PDs is not less than the number of pumping light wavelengths and not more than the number of the signal lights.

While monitoring signals for controlling each pumping light power are set to have 1576.6 nm, 1583.7 nm, 1590.8 nm and 1598.5 nm in the first embodiment and to have 1574.54 nm, 1591.26 nm and 1608.76 nm in the second embodiment, the present invention is not limited to the wavelengths of the monitoring signals shown in the embodiments.

While in the present embodiments, after the pumping light WDM coupler 1, a signal light is monitored by the PD to control pumping light LDs having different wavelengths, the present invention can be realized also by changing a place where the PD which monitors a signal light is disposed.

While in the present embodiments, the signal wavelength band is set to range from 1574 to 1609 nm, the present invention can be also realized by changing the signal wavelength band.

While in the present embodiments, a monitoring signal for controlling a pumping light LD is branched into a light of each wavelength by using the AWG 5 after the branch coupler 4, the present invention is not limited to the embodiments in a manner of taking out a monitoring signal.

While in the present embodiments, a branch ratio of the coupler which branches a signal light is set to be 13 dB, the present invention is not limited to the embodiments in a branch ratio of the branch coupler.

The Raman amplification repeater and the optical transmission system using the same according to the present invention achieve such excellent effects as set forth below.

Firstly, since control is possible by simple negative feedback control, control of a Raman amplifier is simplified to enable high-speed control accordingly, so that even when a transmission path loss varies due to a change of environments or the like or when a signal spectrum slants in the transmission path, it is possible to automatically maintain output signal power to be a fixed value and control an output spectrum in a signal band to be flat.

Secondly, unlike conventional art in which monitored is a peak value of a gain about 13.2 THz apart from a pumping light wavelength, that is, a signal outside of a signal band, by monitoring a few waves of output signal light power in the signal band in view of practicality, even used together with an amplifier other than a Raman amplifier, a loss of a monitoring signal can be suppressed as much as possible to measure a monitoring signal level in Raman amplification precisely, while wavelength selection is facilitated because a signal light in the signal band is monitored, thereby realizing simplification of manufacturing.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A Raman amplification repeater configured to conduct amplification of signal lights by Raman scattering which occurs when pumping lights are applied to a transmission path fiber, the Raman amplification repeater having an arrayed waveguide grating through which bundles of signal lights are divided into a plurality of wavelengths that are monitored and converted to voltage signals that drive circuits associated with each pumping light, wherein output power of said pumping light is controlled by monitoring signal light power by using signal lights having wavelengths for monitoring whose number is not less than the number of said pumping light wavelengths and not more than the number of signal lights and which are monitoring wavelengths in a signal band of said signal light, wherein said monitoring wavelength is set to be a maximum or a minimum value of a Raman amplification spectrum in the signal band.

2. The Raman amplification repeater as set forth in claim 1, wherein said monitoring wavelength is set to be a maximum or a minimum value of a Raman amplification spectrum in the signal band, and negative feedback control of said pumping light is conducted by amplifying said signal light of said monitoring wavelength such that power of the spectrum at said monitoring wavelength which is set to be the bottom value of the Raman amplification spectrum in said signal band has a target value set in advance.

3. The Raman amplification repeater as set forth in claim 1, wherein said monitoring wavelength is set to be a maximum or a minimum value of a Raman amplification spectrum in the signal band, and negative feedback control of said pumping light is conducted of amplifying said signal light of said monitoring wavelength such that power of the spectrum at said monitoring wavelength which is set to be the minimum value of the Raman amplification spectrum in said signal band has a target value set in advance, said target value being set according to minimum output signal power in said signal band.

4. The Raman amplification repeater as set forth in claim 1, wherein
said monitoring wavelength is set to be a maximum or a minimum bottom value of a Raman amplification spectrum in the signal band, and
negative feedback control of said pumping light power is conducted by amplifying said signal light of said monitoring wavelength such that power of the spectra at a plurality of said monitoring wavelengths which are set to be the maximum value of the Raman amplification spectrum in said signal band has no difference.

5. The Raman amplification repeater as set forth in claim 1, wherein
said monitoring wavelength is set to be the maximum or a minimum value of a Raman amplification spectrum in the signal band,
negative feedback control of said pumping light is conducted by amplifying said signal light of said monitoring wavelength such that power of the spectrum at said monitoring wavelength which is set to be the minimum value of the Raman amplification spectrum in said signal band has a target value set in advance, and
negative feedback control of said pumping light power is conducted of amplifying said signal light of said monitoring wavelength such that power of the spectra at a plurality of said monitoring wavelengths which are set to be the maximum value of the Raman amplification spectrum in said signal band has no difference.

6. The Raman amplification repeater as set forth in claim 1, wherein
said monitoring wavelength is set to be a maximum or a minimum value of a Raman amplification spectrum in the signal band,
negative feedback control of said pumping light is conducted by amplifying said signal light of said monitoring wavelength such that power of the spectrum at said monitoring wavelength which is set to be the minimum value of the Raman amplification spectrum in said signal band has a target value set in advance,
said target value being set according to minimum output signal power in said signal band, and
negative feedback control of said pumping light power is conducted of amplifying said signal light of said monitoring wavelength such that power of the spectra at a plurality of said monitoring wavelengths which are set to be the maximum value of the Raman amplification spectrum in said signal band has no difference.

7. The Raman amplification repeater as set forth in claim 1, wherein
said monitoring wavelength is set at least to be a wavelength at the opposite ends of the signal band or in the vicinity of the opposite ends, or at the center or in the vicinity of the center of the signal band.

8. The Raman amplification repeater as set forth in claim 1, wherein
said monitoring wavelength is set at least to be a wavelength at the opposite ends of the signal band or in the vicinity of the opposite ends, or at the center or in the vicinity of the center, and
negative feedback control is conducted of changing power of the pumping light such that each signal light power monitored by said monitoring wavelength has a control target value.

9. An optical transmission system for transmitting, by using a Raman amplification repeater configured to conduct amplification of signal lights by Raman scattering which occurs when pumping lights are applied to a transmission path fiber, said signal light on said optical transmission path, the Raman amplification repeater having an arrayed waveguide grating through which bundles of signal lights are divided into a plurality of wavelengths that are monitored and converted to voltage signals that drive circuits associated with each pumping light, wherein
said Raman amplification repeater controls output power of said pumping light by monitoring signal light power by using signal lights having wavelengths for monitoring whose number is not less than the number of said pumping light wavelengths and not more than the number of signal lights and which are monitoring wavelengths in a signal band of said signal light, wherein said monitoring wavelength in said Raman amplification repeater is set to be a maximum value or a minimum value of a Raman amplification spectrum in the signal band.

10. The optical transmission system as set forth in claim 9, wherein
said monitoring wavelength in said Raman amplification repeater is set to be a maximum value or a minimum value of a Raman amplification spectrum in the signal band, and
said Raman amplification repeater conducts negative feedback control of said pumping light of amplifying said signal light having said monitoring wavelength such that power of the spectrum at said monitoring wavelength which is set to be the minimum value of the Raman amplification spectrum in said signal band has a target value set in advance.

11. The optical transmission system as set forth in claim 9, wherein
said monitoring wavelength in said Raman amplification repeater is set to be a maximum value or a minimum value of a Raman amplification spectrum in the signal band, and
said Raman amplification repeater conducts negative feedback control of said pumping light of amplifying said signal light having said monitoring wavelength such that power of the spectrum at said monitoring wavelength which is set to be the minimum value of the Raman amplification spectrum in said signal band has a target value set in advance,
said target value being set according to minimum output signal power in said signal band.

12. The optical transmission system as set forth in claim 9, wherein
said monitoring wavelength in said Raman amplification repeater is set to be a maximum value or a minimum value of a Raman amplification spectrum in the signal band, and
said Raman amplification repeater conducts negative feedback control of said pumping light power by amplifying said signal light having said monitoring wavelength such that power of the spectra at a plurality of said monitoring wavelengths which are set to be the maximum value of the Raman amplification spectrum in said signal band has no difference.

13. The optical transmission system as set forth in claim 9, wherein
said monitoring wavelength in said Raman amplification repeater is set to be a maximum value or a minimum value of a Raman amplification spectrum in the signal band, and said Raman amplification repeater conducts negative feedback control by said pumping light of amplifying said signal light having said monitoring wavelength such that power of the spectrum at said monitoring wavelength which is set to be the minimum value of the Raman amplification spectrum in said signal band has a target value set in advance, and said Raman amplification repeater conducts negative feedback control of said pumping light power of amplifying said signal light having said monitoring wavelength such that power of the spectra at a plurality of said monitoring wavelengths which are set to be the maximum value of the Raman amplification spectrum in said signal band has no difference.

14. The optical transmission system as set forth in claim 9, wherein said monitoring wavelength in said Raman amplification repeater is set to be a maximum value or a minimum value of a Raman amplification spectrum in the signal band, and said Raman amplification repeater conducts negative feedback control of said pumping light by amplifying said signal light having said monitoring wavelength such that power of the spectrum at said monitoring wavelength which is set to be the minimum value of the Raman amplification spectrum in said signal band has a target value set in advance, said target value being set according to minimum output signal power in said signal band, and said Raman amplification repeater conducts negative feedback control of said pumping light power of amplifying said signal light having said monitoring wavelength such that power of the spectra at a plurality of said monitoring wavelengths which are set to be the maximum value of the Raman amplification spectrum in said signal band has no difference.

15. The optical transmission system as set forth in claim 9, wherein said monitoring wavelength in said Raman amplification repeater is set at least to be a wavelength at the opposite ends of the signal band or in the vicinity of the opposite ends, or at the center or in the vicinity of the center of the signal band.

16. The optical transmission system as set forth in claim 9, wherein said monitoring wavelength in Raman amplification repeater is set at least to be a wavelength at the opposite ends of the signal band or in the vicinity of the opposite ends, or at the center or in the vicinity of the center, and said Raman amplification repeater conducts negative feedback control of changing power of the pumping light such that each signal light power monitored by said monitoring wavelength has a control target value.

17. A Raman amplification control method in a Raman amplification repeater which conducts amplification of signal lights by Raman scattering which occurs when pumping lights are applied to a transmission path fiber, including the step of controlling output power of said pumping light by monitoring signal light power by using signal lights having wavelengths for monitoring whose number is not less than the number of said pumping light wavelengths and not more than the number of signal lights and which are monitoring wavelengths in a signal band of said signal light, wherein said monitoring wavelength is set to be a maximum value or a minimum value of a Raman amplification spectrum in the signal band.

18. The Raman amplification control method as set forth in claim 17, including the steps of:

setting said monitoring wavelength to be a maximum value or a minimum value of a Raman amplification spectrum in the signal band, and conducting negative feedback control of said pumping light of amplifying said signal light of said monitoring wavelength such that power of the spectrum at said monitoring wavelength which is set to be the maximum value of the Raman amplification spectrum in said signal band has a target value set in advance.

19. The Raman amplification control method as set forth in claim 17, including the steps of:

setting said monitoring wavelength to be a maximum value or a minimum value of a Raman amplification spectrum in the signal band, and conducting negative feedback control of said pumping light of amplifying said signal light having said monitoring wavelength such that power of the spectrum at said monitoring wavelength which is set to be a minimum value of the Raman amplification spectrum in said band has a target value set in advance based on minimum output signal power in said signal band.

20. The Raman amplification control method as set forth in claim 17, including the steps of:

setting said monitoring wavelength to be a maximum value or a minimum value of a Raman amplification spectrum in the signal band, and conducting negative feedback control of said pumping light power by amplifying said signal light having said monitoring wavelength such that power of the spectra at a plurality of said monitoring wavelengths which are set to be the maximum value of the Raman amplification spectrum in said signal band has no difference.

21. The Raman amplification control method as set forth in claim 17, including the steps of:

setting said monitoring wavelength to be a maximum value or a minimum value of a Raman amplification spectrum in the signal band, conducting negative feedback control of said pumping light by amplifying said signal light having said monitoring wavelength such that power of the spectrum at said monitoring wavelength which is set to be the minimum value of the Raman amplification spectrum in said signal band has a target value set in advance, and conducting negative feedback control of said pumping light power of amplifying said signal light having said monitoring wavelength such that power of the spectra at a plurality of said monitoring wavelengths which are set to be the peak value of the Raman amplification spectrum in said signal band has no difference.

* * * * *